United States Patent [19]

Bonifer et al.

[11] Patent Number: 4,942,957
[45] Date of Patent: Jul. 24, 1990

[54] CONVEYING ROLLER APPARATUS

[75] Inventors: Edgar Bonifer, Münster; Walter Duttiné, Offenbach am Main; Jahns, Werner, Seligenstadt; Helmut Kratz, Rodgau, all of Fed. Rep. of Germany

[73] Assignee: Mannesmann Aktiengesellschaft, Düsseldorf, Fed. Rep. of Germany

[21] Appl. No.: 353,742

[22] Filed: May 18, 1989

[30] Foreign Application Priority Data

May 19, 1988 [DE] Fed. Rep. of Germany ....... 3817388

[51] Int. Cl.$^5$ .............................................. B65G 13/06
[52] U.S. Cl. .................................................. 198/781
[58] Field of Search .................... 198/781, 790
[56] References Cited

U.S. PATENT DOCUMENTS

| 3,420,355 | 1/1969 | De Good et al. | 199/781 |
| 4,609,098 | 9/1986 | Morgan et al. | 198/781 |
| 4,854,445 | 8/1989 | Eaton et al. | 199/781 |

FOREIGN PATENT DOCUMENTS

| 3434092 | 3/1986 | Fed. Rep. of Germany | 198/781 |
| 3522177 | 12/1986 | Fed. Rep. of Germany . | |

Primary Examiner—Joseph E. Valenza
Attorney, Agent, or Firm—Cohen, Pontani & Lieberman

[57] ABSTRACT

A conveying roller device having holding locations for the material to be transported in which switch bars (4) extend above the supporting rolls (2) which are mounted between side plates (1) and are driven at the holding positions A, B and C by the drive belt (3). Drive belt (3) is pressed by the belt rolls (5), in raised position, against the supporting rolls (2). Holding position A is the frontmost holding position of the conveying device and switch plate (10A) thereof has been brought into preparatory position by an external control element in the form of a valve or limit switch, i.e. the external control element has, in a pneumatic or electrical logic circuit, created the prerequisite for the holding process which is to take place. This prerequisite can also be established in that a switch bar (4) has been displaced by a piece of material to be transported at a second holding position in front of a first holding position A. Switch bar 4 is developed as two-armed lever and actuates a control element (8) with the lower end (4a) thereof. The control element (8) is also connected to the logic circuit (15) via control lines (14).

15 Claims, 3 Drawing Sheets

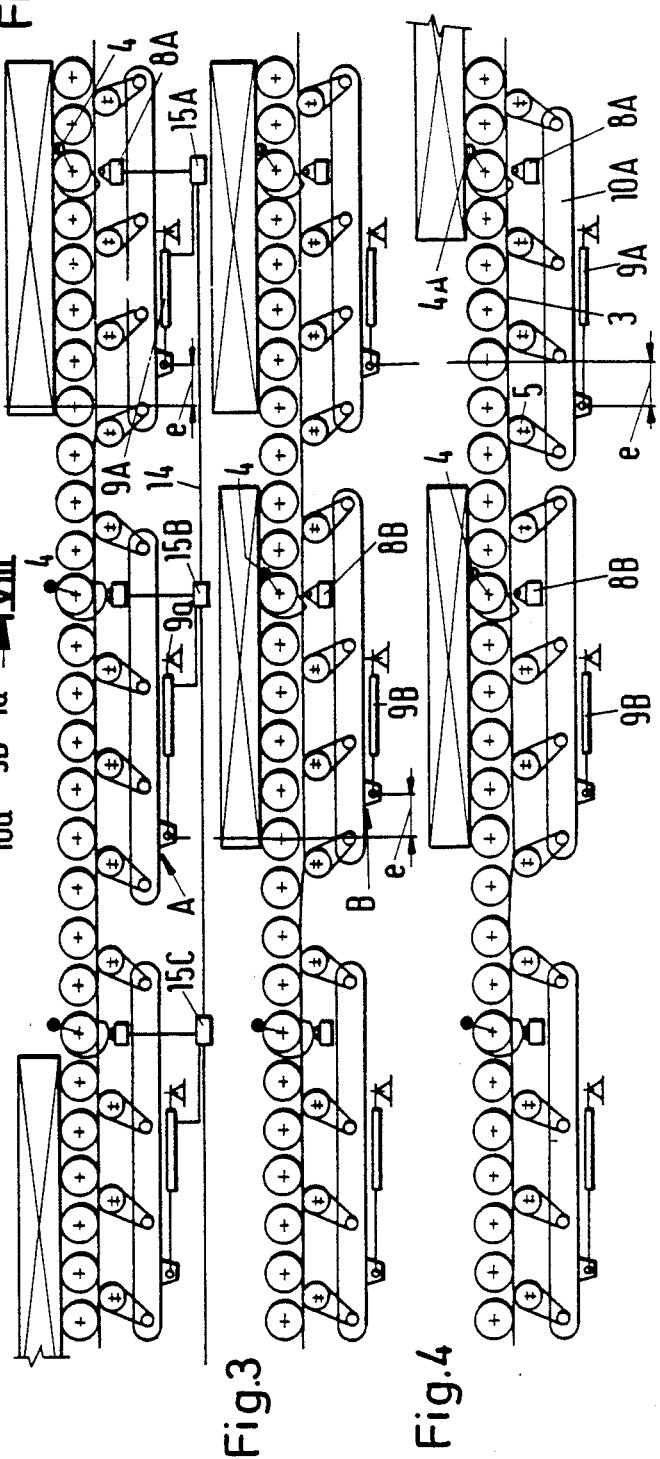

CONVEYING ROLLER APPARATUS

FIELD OF THE INVENTION

The invention relates to a conveying roller apparatus and, specifically, to a roller-type conveyor having holding locations for the material to be transported and wherein at each holding location the rolls can be selectively driven and stopped.

BACKGROUND AND SUMMARY OF THE INVENTION

In a conveying roller apparatus with one or more holding locations for the goods to be transported according to German Pat. No. 35 22 177, the switch bars are displaced in a cumbersome manner against the force of springs. In , the switch rolls are turned by the drive belt after they have been contacted by a spring. This type of operation is expensive and unreliable based on the problematical cooperation between the spring and the switch roll which is required to move the switch bar.

It is therefore an object of the present invention to simplify the structure and operation of a conveying roller apparatus of the above-mentioned type and to render the operation of the conveyor with its holding locations for the goods to be transported more reliable. This object is achieved by forming the switch bar which is present at each holding location as a two-armed lever. The lower end of the lever actuates a control element which, via a logic circuit, controls the positioning apparatus for reciprocating movement of a switch plate which is provided with a pin joint pivotally engaging a lever of the switch roll which, in turn, is provided with the eccentric bearing ring and the eccentric supporting ring so that the drive belt and the brake belt are alternatingly engaged and disengaged with the supporting rolls. The control elements and logic controls for controlling the positioning apparatus are known and inexpensive and proven components.

Preferably, the angle between the lever of the switch roll and its eccentric bearing ring for the belt roll is about 135° and the eccentric supporting ring for the brake roll protrudes on the opposite side thereof, so that with a sufficiently large stroke of the switch plate and corresponding turning of the switch roll by its lever, the belt roll either presses the drive belt, in driving manner, against the supporting rolls or the brake belt is pressed, in a braking manner, against the supporting rolls. The control element and the positioning apparatus can be a pressurized medium activated apparatus or an electrical device. The positioning apparatus can also have a predetermined stroke. All the above-mentioned elements of the roller conveyer are connected with a logic circuit via control lines in known manner.

BRIEF DESCRIPTION OF THE DRAWINGS

One embodiment of the present invention will be explained in detail below with reference to the accompanying drawings in which:

FIGS. 1–4 are schematic views of a roller conveyor in various holding positions;

DETAILED DESCRIPTION OF THE PRESENTLY PREFERRED EMBODIMENT

Figure 5:
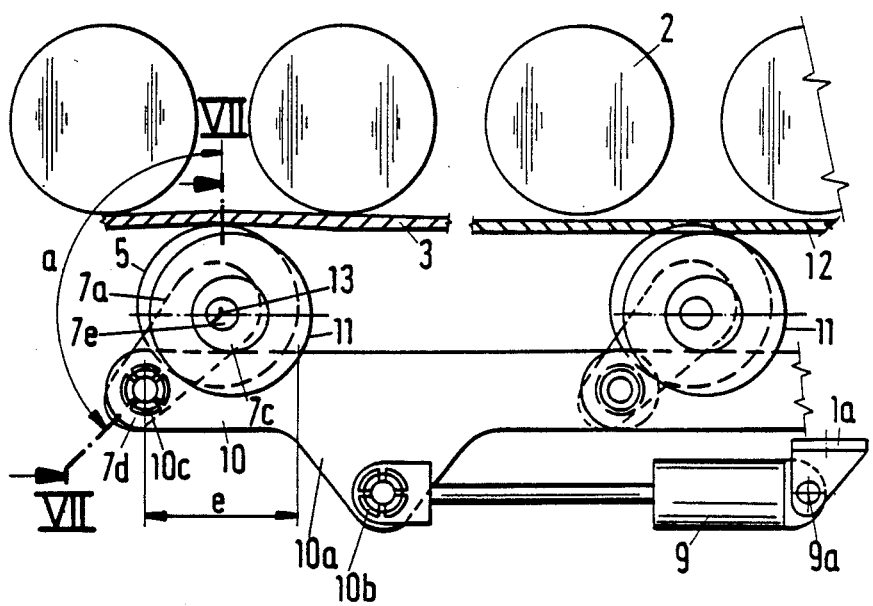
FIG. 5 is an enlarged view of detail A of FIG. 2.

In the position shown in FIG. 1, all switch bars 4 extend above the supporting rolls 2 which are mounted between side plates 1 and are driven at the holding locations A, B and C by the drive belt 3. Drive belt 3 is pressed against the supporting roll 2 by the drive belt rolls 5 when drive belt rolls 5 are in the raised position as shown. The holding location A is the frontmost holding location of the conveying roller device and its switch plate 10A has been brought into preparatory position by an external control element 8 in the form of a valve, a limit switch or the like, i.e. the external control element 8 has created, in a pneumatic or electrical logic circuit, the prerequisite for the holding process which is to take place. This prerequisite can also be created in that a switch strip 4 is displaced at a holding location B in front of holding location A by the material to be transported. In accordance with the present invention the switch bar 4 is part of and is developed as a two-armed lever having a lower lever end 4a for actuating the control element 8. Control element 8 is also connected via control lines 14 to the logic circuit 15 of FIG. 2 and, via a positioning apparatus 9, causes the reciprocating displacement of the switch plate 10 via its bearing lug 10a in the direction of transport or opposite thereto.

Figure 6:
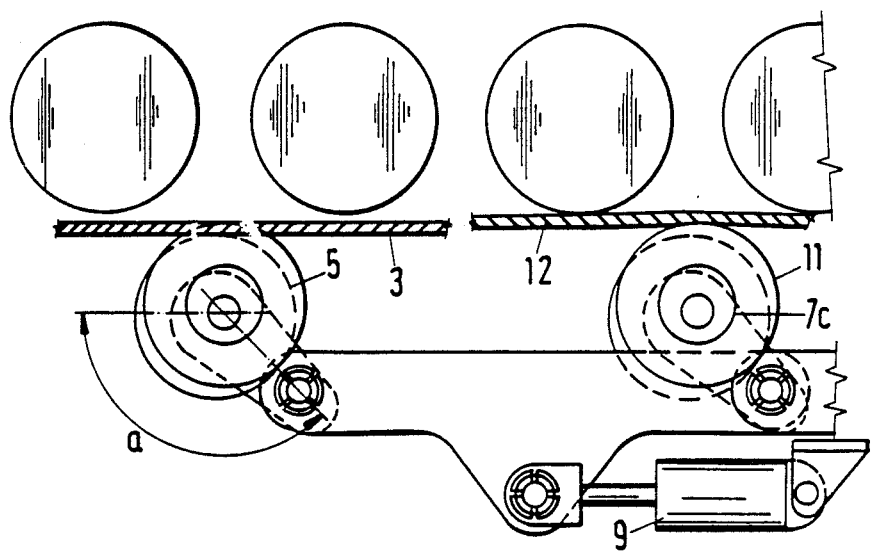
FIG. 6 is an enlarged view of detail B of FIG. 3.

In the switch position of FIG. 2, a piece of material to be transported has pressed the switch bar 4 down at the holding location A and thereby triggered the control element 8A which, in turn, via the logic circuit 15 actuates the positioning apparatus 9A which will execute a movement or stroke of about 40 mm so that the switch rolls 7 are turned via their levers 7a by about 90°, as can be seen by a comparison of FIGS. 5 and 6.

Figure 7:
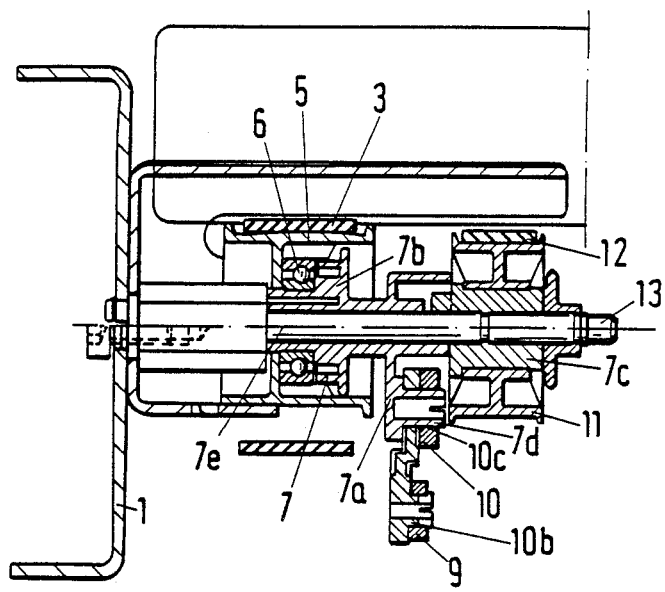
FIG. 7 is a sectional view along the line VII—VII in FIG. 5.

In the position according to FIGS. 5 and 7, the belt rolls 5 have been raised so that the drive belt 3 is pressed and thus is resting against the lower side of the supporting rolls 2. While the drive belts are pressed against the supporting rolls 2, brake belts 12 are disengaged from the supporting rolls 2 due to the movement of eccentric supporting ring 7c as is further explained below. FIG. 7 shows the side plate 1 with an eccentric support axis 13 on which the switch roll 7 is mounted. The switch roll 7, in the position shown in FIG. 7, has on its end facing the side plate 1 an upwardly directed eccentric bearing ring 7b for a bearing 6 of the belt roll 5 and, at its other end, a predominantly downwardly directed eccentric supporting ring 7c for brake roll 11 on which the brake belt 12 is supported. Since the brake roll 12 turns only slightly relative to the eccentric support rings 7c, no special bearing is required for the brake roll 11. Due to the manner the switch roll 7 is manufactured, the switch roll 7 is made of different parts, i.e. the region of eccentric supporting ring 7c and the region of the eccentric bearing ring 7b which is additionally provided with a lever 7a. Lever 7a is attached with a pin 7d through a bore 10c to the switch plate 10. Switch plate 10 is provided with a downwardly protruding bearing lug 10a and with a pin joint 10b for the attachment of the positioning apparatus 9 which is pivotally mounted by an axis 9a to a bracket 1a at the side plate 1.

Figure 8:
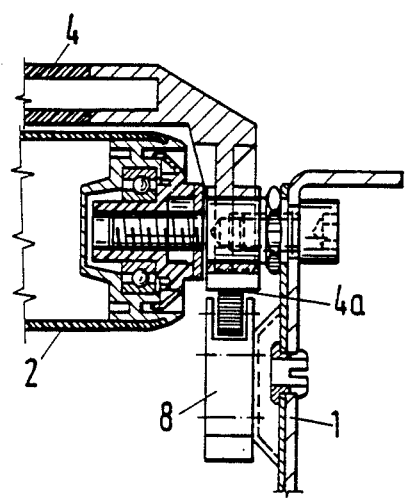
FIG. 8 is an enlarged sectional view along the line VIII—VIII in FIG. 1.

If a piece of material to be transported displaces the switch bar 4 which is associated with a supporting roll 2 at a holding location, the downwardly extending lever 4a of the switch bar 4, as shown in FIG. 8, actuates control element 8 arranged on the side plate 1. This control element causes, via the logic circuit 15 in known manner, the positioning apparatus 9 to move by a distance or stroke e which will swing the switch plate 10 into the position shown in FIG. 6. The switch roll is thereby turned by the lever 7a by about 90° and the brake roll 11 is now raised above the eccentric support ring 7c into a position wherein it now engages the supporting roll 2, while the eccentric bearing ring 7b for the belt roll 5 is lowered by the angle a, as shown in FIG. 6. Thus, the drive belt 3 no longer rests against and thus no longer drives the supporting rolls 2, which are, therefore, immediately stopped by the brake belt 12 which is fixed in the axial direction.

In the position according to FIG. 3, the piece of material to be transported has actuated the switch bar 4 of the holding position B and consequently has released the drive belt 3 from the supporting rolls 2 by lowering the belt rolls 5 as described above. The switch plate 10B has also executed a stroke e. Via the control element 8B, the switch bar has furthermore created in the logic circuit 15B the prerequisite for a possible holding process at holding location c.

In the position according to claim 4, the previous holding situation at holding location A has been changed. The switch plate 10A has again been displaced in the opposite direction by the amount of the stroke e by a pulse from an external control element via the logic circuit and the positioning apparatus 9A.

When the rear edge of the piece of material to be transported leaves the switch bar 4 at holding location A, the control element 8A and, via the logic circuit, the positioning apparatus 9B, are actuated. The switch plate 10B is thus again displaced to the extent of the previous stroke e, whereby the belt rolls 5 which are mounted eccentrically in the switch rolls 7 as described, are raised thereby pressing the drive belt 3 against the supporting rolls 2 which will then be driven and continue to transport the piece of material placed thereon. When the rear edge of the piece of material to be transported has left the switch bar 4 at holding location B, the control element 8B is actuated and, via the logic circuit 15, will terminate the preparatory position at holding location C.

Since this as well as further embodiments and modifications thereto are intended to be within the scope of the present invention, the above description should be construed as illustrative and not in a limiting sense, the scope of the invention being defined only by the following claims.

What is claimed is:

1. In a conveying roller apparatus having holding locations for the material to be transported and including supporting rolls (2) and switch bars (4) which can be moved into the path of transport for releasing a drive belt (3) from the supporting rolls (2), the drive belt (3) being guided by belt rolls (5) which can be raised and lowered, each belt roll being mounted on an eccentric ring (7b) of a switch roll (7) which is mounted on an eccentric support axis (13), the switch roll (7) having adjacent the eccentric bearing ring (7b) an eccentric support ring (7c) for a brake roll (11) which, in its raised position presses at a brake belt (12), which is fixed in the direction of transport, from below against the supporting rolls (2), all switch rolls (7) of a holding location being controlled by an axially displaceable switch plate 10, the improvement comprising:

a pivotally mounted lever forming said switch bar (4) having a lower end (4a); a control element (8) mounted on said side plate (1) for engagement by said lower end (4a) of said lever; a straight lever (7a) having one end thereof attached to said switch roll (7) in fixed position, said switch plate (10) being pivotally connected to the other end of said lever (7a) of said switch roll (7) by pin joints (10b); a positioning apparatus (9) pivotally attached to said switch plate (10) and operatively connected to said control element (8) for control by said element; and a logic circuit (15) connected to said control element (8) and said positioning apparatus (9).

2. The conveying roller apparatus according to claim 1, wherein said bearing ring (7b) has a bore (7e) therein for the mounting thereof on said eccentric bearing axis (13); said eccentric bearing ring (7b) of said switch roll being arranged at an angle of about 135° relative to the connecting line between said bore (7e) and said lever (7a); and said eccentric support ring (7c) for said brake roll (11) protruding toward the opposite side thereof.

3. The conveying roller apparatus according to claim 1, additionally comprising a bracket (1a) attached to said side plate (1) and wherein said positioning apparatus (9) is swingably mounted about a horizontal axis (9a) on said bracket (1a).

4. The conveying roller apparatus according to claim 3, wherein said positioning apparatus (9) is pressure-medium activated.

5. The conveying roller apparatus according to claim 3, wherein said positioning apparatus (9) is electrically activated.

6. The conveying roller apparatus according to claim 4, wherein said positioning apparatus (9) has a predetermined stroke e.

7. The conveying roller apparatus according to claim 5, wherein said positioning apparatus (9) has a predetermined stroke (e).

8. A conveying roller apparatus having holding locations for the material to be transported comprising:

a plurality of supporting rolls (2) mounted substantially perpendicular to the direction of transport between side plates (1) for supporting the material to be transported;

an eccentric support axis (13) mounted on said side plate (1) and located below said supporting rolls (2) and extending substantially parallel to the axis thereof;

a plurality of switch rolls (7) mounted on said eccentric support axis (13), said switch roll having an eccentric bearing ring (7b) and an eccentric support ring (7c) adjacent thereto;

a belt roll (5) mounted on said eccentric bearing ring (7b) of said switch roll (7);

a drive belt (3) supported by said belt roll (5) between said belt roll (5) and said supporting rolls (2) for driving said supporting rolls when said belt roll is in a raised position;

a brake roll (11) mounted on said eccentric support ring (7c) of said switch roll (7);

a brake belt (12) rigidly secured in the direction of transport on said brake roll (11) for stopping said supporting rolls when said brake roll is in a raised position and said belt roll (5) is in a lowered position;

a control element (9) attached to said side plate (1);

a straight lever (7a) rigidly connected with one end thereof to said switch roll (7) and extending substantially downwardly therefrom;

a switch plate (10) pivotally connected to said other end of said lever (7a);

positioning means (9) pivotally attached to said switch plate (10) for reciprocating movement of said switch plate;

at least one switch bar (4) at each holding location comprising a two-armed lever having a lower end (4a) and being pivotally mounted around an axis of rotation, said switch bar extending into the path of transport so that upon contact with material to be transported said lower end (4a) of said switch bar will actuate said control element (8); and means connecting said control element (8) and said positioning means (9) and said switch plate (10) for actuating said positioning means (9) upon movement of said lower end (4a) of said switch bar (4) so that said lever (7a) and said switch roll are moved into a first position in which said drive belt (3) engages said supporting rolls (2) and said brake belt (12) is separated from said supporting rolls (2) and into a second position in which said drive belt (3) is disengaged from said supporting rolls (2) and said brake belt (12) is raised and pressed against said supporting rolls (2).

9. The conveying roller apparatus according to claim 8, wherein said bearing ring (7b) has a bore (7e) therein for the mounting thereof on said eccentric bearing axis (13); said eccentric bearing ring (7b) of said switch roll being arranged at an angle a of about 135° relative to the connecting line between said bore (7e) and said lever (7a); and said eccentric support ring (7c) for said brake roll (11) protruding toward the opposite side thereof.

10. The conveying roller apparatus according to claim 8, additionally comprising a bracket (la) attached to said side plate (1) and wherein said positioning apparatus (9) is swingably mounted about a horizontal axis (9a) on said bracket (1a).

11. The conveying roller apparatus according to claim 10, wherein said positioning apparatus (9) is pressure-medium activated.

12. The conveying roller apparatus according to claim 10, wherein said positioning apparatus (9) is electrically activated.

13. The conveying roller apparatus according to claim 11, wherein said positioning apparatus (9) has a pre-determined stroke e.

14. The conveying roller apparatus according to claim 12, wherein said positioning apparatus (9) has a pre-determined stroke e.

15. The conveying roller apparatus according to claim 8, wherein said control element (8) and said positioning apparatus (9) are connected to a logic circuit (15) via control lines (14).

* * * * *